United States Patent [19]

Hanagan

[11] Patent Number: 4,462,634
[45] Date of Patent: Jul. 31, 1984

[54] ADJUSTABLE MOTORCYCLE SEAT

[75] Inventor: Michael W. Hanagan, San Jose, Calif.

[73] Assignee: Corbin Pacific Inc., Watsonville, Calif.

[21] Appl. No.: 409,295

[22] Filed: Aug. 18, 1982

[51] Int. Cl.³ .............................................. B62J 1/00
[52] U.S. Cl. .................................. 297/201; 297/243; 297/311
[58] Field of Search ............... 297/201, 243, 313, 335, 297/336, 195, DIG. 9, 193, 311

[56] References Cited

U.S. PATENT DOCUMENTS

| 1,164,207 | 12/1915 | Pawsat . | |
|---|---|---|---|
| 2,080,658 | 5/1937 | Duffy . | |
| 2,920,683 | 1/1960 | Moster | 297/313 |
| 3,486,727 | 12/1969 | Timms . | |
| 3,549,172 | 12/1970 | McBroom et al. | 297/243 |
| 3,580,634 | 5/1971 | Bock . | |
| 3,891,333 | 6/1975 | Corderac'k . | |
| 3,913,974 | 10/1975 | Bowen . | |
| 3,970,345 | 7/1976 | Holcomb | 297/243 |
| 4,125,285 | 11/1978 | Hanagan . | |
| 4,141,587 | 2/1979 | Holcomb . | |
| 4,225,183 | 9/1980 | Hanagan et al. | 297/243 |

FOREIGN PATENT DOCUMENTS

| 175816 | 1/1953 | Austria | 297/243 |
|---|---|---|---|
| 1115212 | 4/1956 | France | 297/201 |
| 1125764 | 11/1956 | France | 297/201 |

Primary Examiner—William E. Lyddane
Assistant Examiner—Mark W. Binder

[57] ABSTRACT

A two-part seat assembly for a motorcycle like vehicle has an operator's seat that is hingedly mounted to enable adjustment of its angle of inclination, and thereby to enable alteration of the operator's body attitude. Skirt portions are provided on the operator's seat to conceal the mechanism by which adjustment of the seat position is achieved, and to hide the frame parts and the concavity in which the operator's seat resides.

7 Claims, 6 Drawing Figures

ADJUSTABLE MOTORCYCLE SEAT

BACKGROUND OF THE INVENTION

Motorcycle seats which have defined portions for the operator and the passenger, and which may also have backrest structures, presently enjoy widespread popularity; such a seat is described in Hanagan U.S. Pat. No. 4,125,285. In the past, cycle seats having a variety of adjustment features have been proposed, an example of which is the construction disclosed in Bowen U.S. Pat. No. 3,913,974, which provides a pivotal backrest behind the rider's position. Seats that are themselves angularly adjustable have been disclosed in U.S. Pat. Nos. 1,164,207 to Pawsat, 2,080,658 to Duffy and 3,891,333 to Coderac'k. Tiltable seats for purposes other than use on motorcycles or other vehicles have also been described in the art, such as the drummer's seat shown in Bock U.S. Pat. No. 3,580,634.

In a motorcycle, it is especially desirable that the operator's seat be adjustable through a range of angles, so that the rider can change his body position, or attitude. This is beneficial not only to achieve a generally comfortable relationship to the handlebars and the foot pegs of the cycle, but also to realize the advantages that different body positions can provide in combating fatigue during extended travel periods.

While such adjustability of the operator's seat is, in and of itself, of prime importance, it is also a matter of considerable concern that the seat offer such capability without detracting from its overall appearance. If the mechanism by which adjustability is achieved was, for example, exposed, or if unsightly gaps were presented as a result of changes in seat position, the structure would be unacceptable from an aesthetic standpoint. It goes without saying that, in addition to the foregoing features, any such seat must exhibit high structural strength and must offer good overall comfort, as can be provided only by proper frame construction and suitable cushioning means.

Accordingly, it is a principal object of the present invention to provide a novel two-part seat assembly for a motorcyle or like vehicle, in which the operator's seat is angularly adjustable between at least two positions, and preferably through a range of positions therebetween, so as to enable the rider to change his body attitude relative to the cycle.

It is also an object of the invention to provide such an assembly in which the adjustment mechanism and the space for the operator's seat are concealed from view, regardless of the operative position of the latter, thereby maintaining an attractive appearance for the assembly.

Another object of the invention is to provide an assembly having the foregoing features and advantages, which is also rugged and durable, and relatively uncomplicated and inexpensive to manufacture.

SUMMARY OF THE INVENTION

It has now been found that the foregoing and related objects of the invention are readily attained in a two-part seat assembly comprising a passenger's seat and an operator's seat, the passenger's seat including an elongated principal base and the operator's seat including a secondary base. The principal base has means thereon for attachment to the frame of the vehicle, and has a seat member disposed adjacent one end thereof. The operator's seat is spaced from the passenger's seat member toward the other end of the principal base, and means is provided thereat for hingedly interconnecting the principal and secondary bases, to enable pivoting of the operator's seat between lowered and elevated positions. In the fully lowered position, the secondary base lies closely adjacent the principal base, whereas in the elevated position the secondary base is inclined upwardly therefrom. At least one of the seats of the assembly has adjustable means thereon providing underlying support for the operator's seat in its elevated position, and the operator's seat member includes a seat portion and lateral skirt portions depending along the opposite sides thereof, the latter being dimensioned and configured to substantially conceal the principal base in both positions of the operator's seat.

In the preferred embodiments, the adjustable means will be adapted to provide underlying support in a range of positions between the fully lowered and fully elevated positions of the operator's seat. Such means may suitably comprise a member that is threadably engaged on the "one" seat and extends toward the other seat, and is concealed between the skirt portions of the operator's seat. Most desirably, the adjustable means will comprise a pair of jacking studs mounted upon the secondary base at laterally-spaced locations.

It will generally be desirable to provide corresponding cooperating projecting elements and recesses on the principal base and the secondary base that are so dimensioned, configured and arranged that the elements engage within the recesses. In the most desirable embodiments, the secondary base of the operator's seat will include an upstanding panel that is disposed adjacent the rearward end thereof, to provide backrest structure thereon. The seat members will normally comprise molded cushions made of a foamed synthetic resinous material, with the above-mentioned backrest structure providing support for one such cushion.

DETAILED DESCRIPTION OF THE ILLUSTRATED EMBODIMENT

Figure 1:
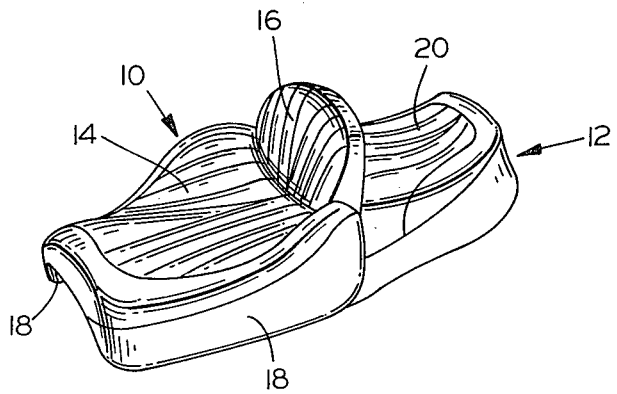
FIG. 1 is a perspective view of a seat assembly embodying the present invention.

Turning now in detail to the appended drawings, therein illustrated is a seat assembly embodying the present invention and consisting of an operator's seat and a passenger's seat, generally designated by the numberals 10, 12, respectively. The operator's seat 10 has a seat member comprised of a seat portion 14, a backrest portion 16, and depending lateral skirt portions 18 along the sides. The passenger's seat includes a seat member 20, which is disposed behind the seat member of the operator's seat 10.

The passenger's seat member 20 is disposed adjacent the rearward end of the principal base 22, and a hinge 24 is affixed adjacent the forward edge thereof. The hinge 24 serves to pivotably join the secondary base 26 of the operator's seat 10 to the principal base 22, the secondary base 26 being dimensioned and configured to seat within the space or well that is defined generally by the principal base 22 forwardly of the seat member 20, thereby permitting the two seats to nest neatly together.

Figure 2:
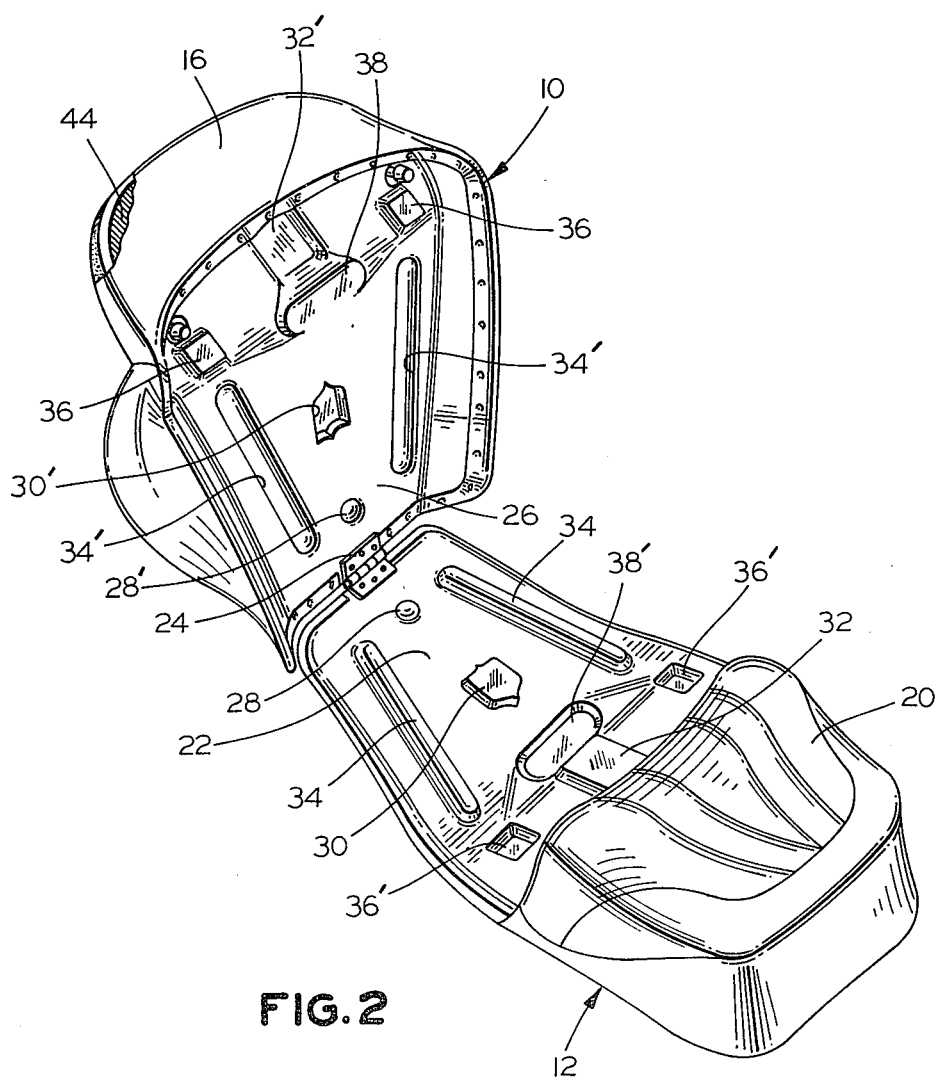
FIG. 2 is an enlarged perspective view of the assembly of FIG. 1, with the operator's seat pivoted away from the principal base to show the construction of the base members used in the assembly.

As can best be seen in FIG. 2, the principal base 22 is formed with a variety of bosses, including hemispherical boss 28, shield-shaped boss 30, square boss 32, and two rib-shaped bosses 34. The secondary base 26 is formed with corresponding recesses (designated with corresponding numbers to which primes have been added), and it also has bosses 36, 38, which are duplicated as indentations on the principal base 22. In the fully nested position of the seats, the several bosses will lie within the corresponding recesses.

The seat members are comprised of cushions, which are conventionally made of a foamed synthetic resinous material, such as foamed polyurethane, molded to the desired configuration; the operator's seat cushion is numbered 40, and that of the passenger's seat is numbered 42. A suitable covering material (not numbered), such as of a heavy gauge vinyl plastic, covers the cushions to provide the necessary integrity and desirable appearance to the assembly, as is also standard practice.

Figure 5:
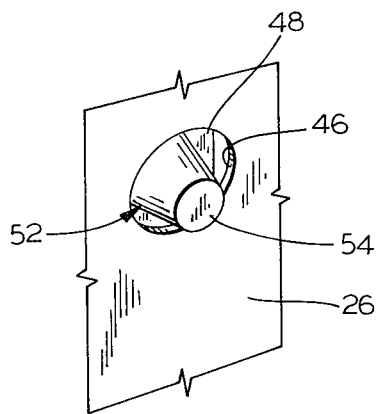
FIG. 5 a fragmentary perspective view of a section of the secondary base, showing the fully retracted position of one of the jacking screws.
Figure 6:
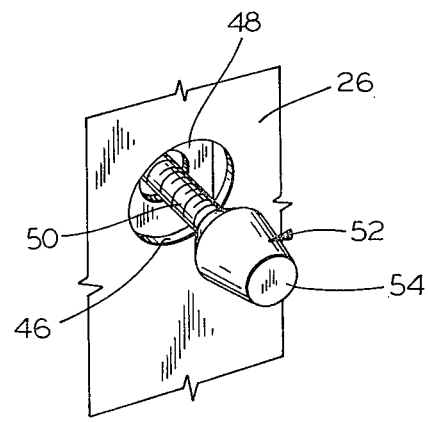
FIG. 6 is a view similar to FIG. 5, showing an extended position of the jacking screw.

The secondary base 26 includes an upstanding part 44, which supports the rear of the cushion 40 and thereby cooperatively provides the backrest portion 16 of the operator's seat 10. A pair of apertures 46 are formed through the base 26, across each of which lies (within the body of the seat 10) a bracket 48 for a threaded element, such as a nut (not visible). The nut engages the threaded shaft 50 of a jacking screw, generally designated by the numeral 52, which has a rubber tip 54 mounted on its outer end; these features are best seen in FIG. 6, which illustrates the jacking screw 52 in an extended position. The retracted position of the jacking screw 52 is illustrated in FIG. 5, which corresponds to the fully lowered position of the operator's seat 10 shown in FIG. 3; the jacking screw position shown in FIG. 6 corresponds to the elevated seat position of FIG. 4. As will readily be understood, the inclination of the seat 10 is adjusted merely by turning the jacking screws 52 inwardly or outwardly, depending upon whether it is to be lowered or raised, respectively. Obviously, the hinge 24 and the threaded shafts 50 permit virtually an infinite number of positions to be assumed beyond the extremes.

Figure 3:
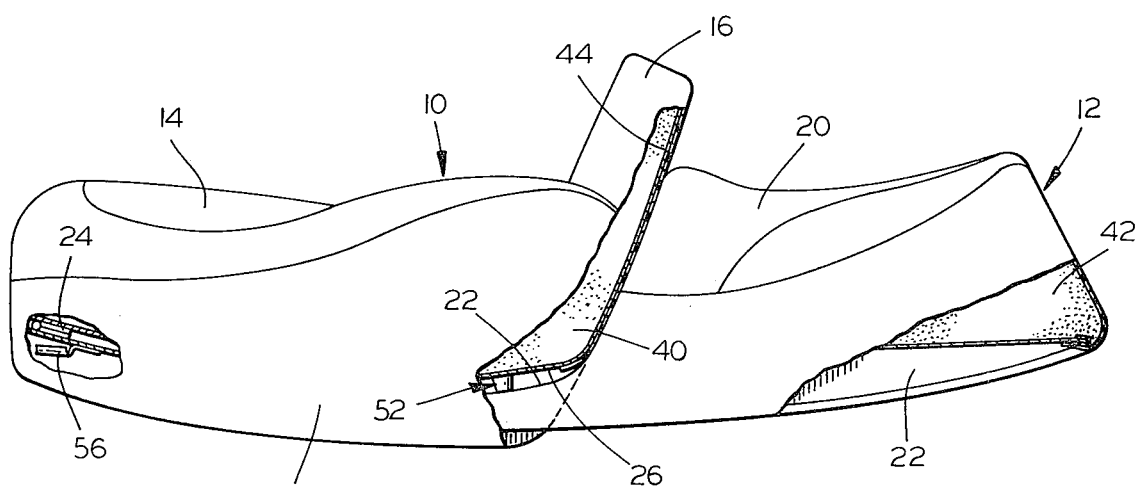
FIG. 3 a side elevational view of the seat assembly of the foregoing Figures with the operator's seat in its fully lowered position, portions of the assembly being broken away to expose internal construction features.

As can be seen in FIG. 3, the principal base 22 also carries on its forward end, beneath the hinge connection 24, a mounting fixture 56, which is dimensioned and configured to receive a projecting part of the cycle frame (not shown). The attachment thus provided cooperates with other mounting means (also not shown) located on the principal frame 22 in a rearwardly spaced position, such as may be comprise a plurality of bolts received through suitable portions of the cycle frame and engaged within the seat assembly.

Figure 4:
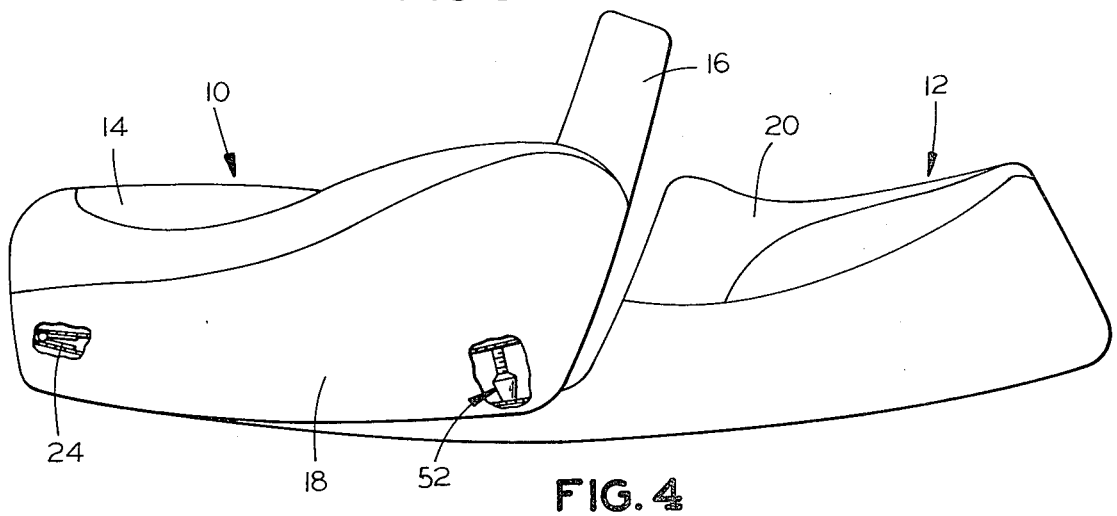
FIG. 4 a view similar to FIG. 3, showing the operator's seat in an alternate position elevated from the lowered position of FIG. 3.

It is most important to note that, regardless of whether the operator's seat 10 is in its lowered position, as in FIG. 3, or its most elevated position, as in FIG. 4, the skirt portions 18 extend to the principal base 22, and thereby obscure all internal structure, including the base itself, the jacking screws 52, and most of the well that is defined in front of the seat member 20. This minimizes visual discontinuity, and lends a high degree of attractiveness to the overall appearance of the seat assembly.

Although not illustrated it should be understood that the assembly of the invention may employ a seat portion 20 that is similarly adjustable to vary its angle of inclination, to thereby afford benefits to the passenger comparable to those enjoyed by the operator. In such a construction, it will be appreciated that similar depending skirt portions 18 will normally be provided, so as to preserve the desirable appearance of the seat assembly. It should also be understood that a wide variety of members can be used to adjustably support the operator's seat in its various positions. For example, wedge-shaped members that can be fixed in positions of different spacing from the hinge might be substituted for the jacking screws. Also, rather than being threaded, jacking studs with discrete engagement recesses along their length, such as for cooperation with locking pins or detents, might be used.

Thus, it can be seen that the present invention provides a novel two-part seat assembly for a motorcycle or like vehicle, in which the operator's seat is angularly adjustable between at least two positions, and preferably through a range of positions therebetween, so as to enable the rider to change his body attitude relative to the cycle. In the assembly, the adjustment mechanism and the space for the operator's seat are concealed from view, regardless of the operative position of the latter, to thereby maintain an attractive appearance; the assembly is rugged and durable, and relatively uncomplicated and inexpensive to manufacture.

Having thus described the invention, what is claimed is:

1. A two-part seat assembly for a motorcycle or like vehicle, comprising: a passenger's seat including an elongated principal base having means thereon for attachment to the frame of the vehicle, and having a seat member thereon adjacent one end thereof; an operator's seat disposed on said principal base towards the other end thereof from said passenger's seat member, said operator's seat including a secondary base; means hingedly connecting said principal base and said secondary base adjacent said other end of said principal base, said operator's seat being pivotable about said means between a lowered position thereof, with said secondary base lying closely adjacent said principal base, and an elevated position in which said secondary base is inclined upwardly therefrom, at least one of said seats having adjustable means thereon providing underlying support for said operator's seat in at least said elevated position thereof, said operator's seat including a seat member comprised of a seat portion and lateral skirt portions depending along the opposite sides thereof, said skirt portions being dimensioned and configured to extend in the direction of said principal base a distance that is sufficient to substantially conceal said base in both of said operator's seat positions.

2. The assembly of claim 1 wherein said adjustable means is adapted to provide underlying support in a range of positions between said first and second positions of said operator's seat.

3. The assembly of claim 2 wherein said adjustable means comprises a member threadably engaged on said one seat and extending toward the other of said seats, said member being disposed between said skirt portions of said operator's seat and hence being concealed thereby.

4. The assembly of claim 2 wherein adjustable means comprises a pair of jacking studs mounted upon said secondary base in laterally spaced locations.

5. The assembly of claim 1 wherein said principal base and said secondary base have corresponding projecting elements and recesses formed therein.

6. The assembly of claim 1 wherein said secondary base includes an upstanding part disposed adjacent the rearward end thereof, to provide back-support structure on said operator's seat.

7. The assembly of claim 1 wherein said seat members comprise moulded cushions fabricated from a foamed synthetic resinous material

* * * * *